(12) United States Patent
Margaryan

(10) Patent No.: US 6,495,481 B1
(45) Date of Patent: Dec. 17, 2002

(54) GLASSES FOR LASER AND FIBER AMPLIFIER APPLICATIONS AND METHOD FOR MAKING THEREOF

(75) Inventor: Alfred A. Margaryan, Glendale, CA (US)

(73) Assignee: Nano Technologies, Juno Beach, FL (US)

(*) Notice: Subject to any disclaimer, the term of this patent is extended or adjusted under 35 U.S.C. 154(b) by 18 days.

(21) Appl. No.: 09/862,887

(22) Filed: May 21, 2001

(51) Int. Cl.$^7$ .............. C03C 3/247; C03C 3/253; C03C 3/16; C03C 3/23; C03C 3/32
(52) U.S. Cl. .............. 501/44; 501/35; 501/37; 501/41; 501/42; 501/43
(58) Field of Search ............. 501/35, 37, 40, 501/41, 42, 43, 44; 65/32.1, 32.5, 66, 134.1, 136.4, 137

(56) References Cited

U.S. PATENT DOCUMENTS

| | | | |
|---|---|---|---|
| 3,119,703 A | 1/1964 | Cleek et al. | 106/47 |
| 3,531,305 A | 9/1970 | Dumbaugh, Jr. | 106/47 |
| 3,846,142 A | 11/1974 | Buzhinsky et al. | 106/47 R |
| 3,954,484 A * | 5/1976 | Broemer et al. | 501/42 |
| 4,076,541 A | 2/1978 | Rapp | 106/47 Q |
| 4,962,995 A | 10/1990 | Andrew et al. | 350/96.34 |
| 5,274,728 A | 12/1993 | Tran | 385/142 |
| 5,392,376 A | 2/1995 | Aitken et al. | 385/144 |
| 5,796,903 A | 8/1998 | Tran | 385/123 |
| 5,846,889 A | 12/1998 | Harbison et al. | 501/40 |
| RE36,513 E | 1/2000 | Aitken et al. | 385/144 |

FOREIGN PATENT DOCUMENTS

JP  8012370  1/1996

OTHER PUBLICATIONS

A. Margaryan, Fluorine-containing germanate glasses, Journal of Materials Science Letters, 1992.

* cited by examiner

*Primary Examiner*—David Sample
*Assistant Examiner*—Elizabeth A Bolden
(74) *Attorney, Agent, or Firm*—Dennis W. Beech

(57) ABSTRACT

New and improved compositions of doped and co-doped germanium fluorophosphate glasses for laser hosts and fiber amplifiers have a high refractive index (nD) 1.67–1.70, high transmission in the near infrared part of the spectra (to 6 micron) and a wide glass-forming domain. These glass systems [$BaGe_4O_9$—$Ba(PO_3)_2$—$RF_x$] contain (mol %): $BaF_2$, $CaF_2$, $MgF_2$, $BiF_3$, $PbF_2$ of 10 to 70 percent and $GeO_2$ 7.31 to 58.48 percent, $P_2O_5$ of 4.81 to 38.50 percent, $BaO$ of 7.86 to 62.94 percent where dopants and co-dopants are over 100 percent (in wt %): $Nd_2O_3(NdF_3)$ of 0.5 to 15 percent, $Er_2O_3(ErF_3)$ of 0.2 to 12 percent, $Yb_2O_3(YbF_3)$ of 1.0 to 15 percent, $Ho_2O_3(HoF_3)$ of 1.0 to 10 percent, $Pr_2O_3(PrF_3)$ of 0.5 to 12 percent, $Tm_2O_3(TmF_3)$ of 0.2 to 10 percent, $Tb_2O_3(TbF_3)$ of 0.1 to 10 percent, $MnO(MnF_2)$ of 0.5 to 20 percent.

22 Claims, No Drawings

GLASSES FOR LASER AND FIBER AMPLIFIER APPLICATIONS AND METHOD FOR MAKING THEREOF

BACKGROUND OF THE INVENTION

1. Field of Invention.

This invention relates to compositions of doped and co-doped Germanium-Fluorophosphate glasses for use as laser hosts and fiber amplifiers. The new and improved glass compositions are more specifically related to glasses based on or containing GeO2, Ba (PO3)2, BaO, and one of BaF2, CaF2, MgF2, PbF2 or BiF3 plus one or more dopants.

2. Description of Related Arts.

Presently, most optical glasses are manufactured in SiO2 base. These glasses have a limited infrared transmission spectra and low optical constant (refractive indices). Unfortunately, these limitations in SiO2 based glass prohibits use for more advanced applications. For example, all new fiber amplifiers need to work in a wide range infrared transmission spectrum that cannot be accomplished with SiO2 base glasses.

The existing laser fluorophosphate glasses which contain (in mass %): BaPO3F (55–66), MgF2 (15–20), Nd2O3 (1–4), Ga2O3 (9–11) were created by Russian scientists. These glasses have a limitation that is caused by a higher rate of inactive (non-active) absorption on the laser wavelength 1,064 nm that causes reduction of luminescence duration of dopant-neodymium, Patent USSR No. 471320 issued 1973.

Furthermore, transparent glasses for the infrared region based on Fluoride containing glass system PbF2-PbO-GeO2 were obtained by G. W. Cleek and E. H. Hamilton, "Infrared Transmitting Germanate Glasses," U.S. Pat. No. 3,119,703 issued 1974, and systems AlF3-PbO-GeO2 by Dumbaugh, W. H., "Method of Making Infrared Transmitting Glasses," U.S. Pat. No. 3,531,305 issued 1976. However, these glasses have a very limited domain of glass formation between GeO2 and Fluorides.

The general structure of glasses on a germanium fluorophosphates base is described in "Germanate Glasses: Structure, Spectroscopy and Properties", by A. Margaryan and M. Piliavin, publishes by Arthek House, Boston and London, 1993. This treatise describes such glasses using infrared methods of measurement of glass properties. However, the book does not describe or provide compositions of specific glasses.

Other existing laser glasses on a phosphate base containing methaphosphates of Li, Na, K, Mg, Ca, Sr, Cd, Ba, Pb, and phosphates of elements Al and Zr, B, Ce, trivalent neodymium $Nd^{3+}$ and trivalent ytterbium $Yb^3$ were developed by I. M. Buzhinsky, et al., U.S. Pat. No. 3,846,142. These glasses are characterized by high specific energy stored by $Yb^{3+}$ in the active element at a section of stimulated emission of at least $2.5 \times 10^{-21}$ $cm^2$. However, these type of glasses have a limited infrared transparency. Fluorophosphate glasses also have been formed on Al(PO3)3, NaPO3, P2O5 and fluorides AlF3, ZrF4, LiF, NaF, MgF2, CaF2, BaF2, LaF3, LnF3 base by L. J. Andrews and W. J. Miniscalco, U.S. Pat. No. 4,962,995. These compositions are recommended for high efficiency $Er^{3+}$ doped optical fiber lasers, amplifiers and super luminescent sources.

Heavy metal oxide glass optical fibers on GeO2, TeO2, Sb2O3, PbO, Bi2O3, Al2O3, P2O5, Al(PO3)3, M(PO3)2 where M is Mg, Ca, Ba or Sr and NPO3 where N is Li, Na or K were created by D. C. Tran, U.S. Pat. No. 5,796,903, and U.S. Pat. No. 5,274,728. The most preferred are those based on GeO2. These glasses are recommended for use in laser medical surgery.

The publication on "Fluorine-Containing Germanate Glasses" A. A. Margaryan, Wai Min Lui. *Journal of Material Science Letters*, Vol. 11, No 22, Nov. 15, 1992, pp 1511–1513 gives a description of glass formation domain and density between RGe4O9—RF2 systems. However, this publication does not include or describe the new ingredients such as: Ba(PO3)2, PbF2, BiF3 and fluorides or oxides of rare elements Nd2O3(NdF3), Er2O3(ErF3), Yb2O3(YbF3), Ho2O3(HoF3), Pr2O3(PrF3), Tm2O3(TmF3), Tb2O3 (TbF3), MnO(MnF2) of this new invention.

Another publication "Synthesis of Glasses in Germanium Fluorophosphate; Systems" A. A. Margaryan, S. S. Karapetyan Mater, *Resp. Soveshch. Neorg. Khim.* $5^{th}$, 1977 pp.54–5 describes only the glass formation domain of germanium fluorophosphates systems BaGe4O9—Ba(PO3)2— RF2 where R only includes Mg, Ca, Sr, Ba. However, these formulations do not include any compositions with rare earth dopants and other fluorides, such as PbF2, BiF3.

The patent "Germanium Oxide Based Glass Composition" by Sakaguchi, Shigeki, Patent No. 08012370 JP discloses glasses for near infrared ray transmission optical fiber, having a composition which is improved in stability to crystallization and reduced Rayleigh scattering in GeO2— P2O5—MFx systems. However, this composition of glass is not doped with rare earth elements and may be used only for passive optics. Additionally, this glass system is different from the present invention system BaGe4O9—Ba(PO3)2— RFx composition.

SUMMARY OF THE INVENTION

This invention is related to germanium-fluorophosphate glass compositions, which are used for laser hosts and fiber amplifiers.

Progress in the optical industry is measured in the creation and manufacturing of new more efficient types of optical glasses. The glasses based on germanium dioxide and phosphates offer many advances over crystalline matrices. Germanium dioxide based glasses have a higher refractive index and dispersion than glasses with silicon dioxide. Germanium dioxide glass index of refraction is (nD=1.6068) and it can be used as a basis for creating special flints that possess higher refractive indices. The high infrared transparency of germanium dioxide allows its use as an essential element in fiber optics technology. Glass-phase GeO2 is transparent as an optical medium in the important spectral region from 0.280 to 5 micron.

In germanium fluorophosphate systems, the range of glass formation increases in the following order BaF2>SrF2>CaF2>MgF2, which shows the increasing strength of the cation field. In comparison, this behavior is the opposite of alkaline earth oxide containing systems. Magnesium fluoride containing glasses are especially distinct in their ability to form glasses with up to 80–85 mol% of MgF2 concentration.

The above-mentioned phenomenon also contributes to formation of the elemental cell structure of germanium fluorophosphate melt. The general features of the infrared spectra show the existence of superimposed spectra of germinates, metaphosphates and orthophosphates or the radicals Me(O,F)6 and MeF4. Intense lines are observed between the wavelength numbers 900–800 $cm^{-1}$, 1,300–1, 000 $cm^{-1}$, and 650–400 $cm^{-1}$. The bands in the region of 900–800 $cm^{-1}$ are due to Ge—O—Ge in $(GeO4)4^-$. The maximal of bands within 1,300–1,000 $cm^{-1}$ are due to oscillations of PO2, POP in the metaphosphate ion (PO3) $n1^-$. Detected bands by groups of the types Me(O,F)6, MeF4, and PO2 in metaphosphate or tetrametaphosphate anions, are responsible for the bands in the region 650–400 $cm^{-1}$.

When increasing the concentration of Ba(PO3)2 in melt, the Ge—O—Ge band shifts in the direction of higher frequencies in exchange for RGe4O9.

Glasses that contain 50–60 mol % Ba(PO3)2 have fluorophosphates and germanium phosphate as structural forming components. The bands of Ge—O—P are found in the regions 1,110–1,100 $cm^{-1}$ and 1,070–1,050 $cm^{-1}$. This creates the formation of germanium orthophosphate structures, Ge3(PO4)4. Glasses containing more than 60 mol % Ba(PO3)2 are formed by fluorophosphate and pure germanate components. Fluoride containing germanium phosphate glasses are formed from structural elements of the form $(GeO4)4^-$, $(PO3)n1^-$, $Ge^-(^-O^-P^-)$ Me(O,F)6 or $(MeF4)2^-$.

Germanium fluorophosphate glasses are effective and efficient in the process of creation of laser hosts and amplifiers. These glasses have a high spectral transparency in the ultraviolet (UV), visible (VIS) and infrared (IR) frequencies. There is a possibility of including a high concentration of dopants: to 20–25 wt % for fn elements (rare-earth elements), and to 40–50 wt % for dn elements (transition elements), which is significantly higher than crystalline materials high concentration of dopants 1–5 wt %. Phosphor and germanium content glasses were chosen for the following reasons: They have a large glass-forming region, they can be used as a host with fluorine ions, and they show good thermo-mechanical and chemical properties.

These and other features, aspects and advantages of the present invention will become better understood with reference to the following drawings, description and claims.

DESCRIPTION OF THE PREFERRED EMBODIMENT

The following detailed description is the best currently contemplated modes for carrying out the invention. The description is not to be taken in a limiting sense, but is made merely for the purpose of illustrating the general principles of the invention.

The preferred materials for the present invention are glasses based on or containing GeO2, Ba(PO3)2, BaO, BaF2, CaF2, MgF2, BiF3, PbF2, Nd2O3(NdF3), Er2O3 (ErF3), Yb2O3(YbF3), Ho2O3(HoF3), Pr2O3(PrF3), Tm2O3(TmF3), Tb2O3(TbF3), MnO(MnF2). The raw compounds used for glass formation are: Metaphosphate Barium, Ba(PO3)2; Tetragermanate Barium, BaGe4O9 and Fluorides, RF2 where R is Ba, Ca, Mg, Pb, and BiF3.

Erbium glass lasers on phosphate and germanium base are capable of emitting eye safe 1,540 nm laser radiation directly. 20 watts of average power at 1,540 nm has been achieved. This is many times larger than current commercially available Erbium silicate glass lasers. Concentration of dopants in glass is very important in determining the characteristics of laser materials.

Erbium doped fiber amplifiers (EDFA) have efficient optical amplification around the 1,550 nm telecommunication band. Use of wide bandwidth gain flattened EDFA's can be fully transparent, easily upgradeable optical networks through Wavelength Division Multiplexing (WDM). Erbium ions, Er(III), have quantum levels that allow them to be stimulated to emit in the 1,540 nm band.

Neodymium doped thermal phosphate laser glass has special optical qualities. The superior performance of Neodymium doped thermal phosphate glass is due to the high neodymium Nd2O3 concentration.

Other rare earth elements (fn) are also usable for creation of laser hosts and fiber amplifiers generated in different wavelengths; Yb2O3(YbF3), Ho2O3(HoF3), Pr2O3(PrF3), Tm2O3(TmF3), Tb2O3(TbF3).

The preferred glass forming compounds, BaGe4O9 and Ba(PO3)2 are characterized as chemically stable substances. In combination they create a significant free or open volume structure due to the large ionic radii of Barium (1.380° Å) as in BaGe4O9, Ba(PO3)2, BaF2. This allows the melt to produce a homogenous melted material with regular distribution of dopant activation ions (Nd,Er, Ho, Pr, Tm and Tb) and sensitizers (Mn, Yb).

The melting process is conducted in the temperature range of 1,230 to 1,310° C. in platinum crucibles in a dry argon atmosphere for 4 to 5 hours followed by an annealing temperature range of 350 to 360° C. for 5 to 6 hours.

The presence of Barium Fluoride (BaF2) in laser glasses increases the chemical durability. In the grouping of glasses according to chemical stability of non-silicate glasses relating to humidity or moisture, these glasses are considered to be stable glasses. The melting process between Ba(P)3)2 and BaF2 causes interaction of these. two components. This creates a formulation of BaPO3F, monofluorophosphate of Barium. In this formulation when doped with Nd(III), Neodymium ions, the duration of luminescence for a laser wavelength of 1,064 nm is 400 to 430 ms, and the half width of the luminescence band is 160 to 165 $cm^{-1}$. For with doping Er(III), Erbium ions, the duration of luminescence in the laser wavelength of 1,535 nm is 490 to 500 ms, and the half width of the luminescence band is 148 to 150 $cm^{-1}$.

Other researchers have obtained transparent glasses for the infrared region based on glass systems containing Fluoride as for example PbF2—PbO—GeO2, AlF3—PbO—GeO2, and RF—TiO2—GeO2 where R is from group Li, Na, K. See for instance Frey, A. F. and S. Nielsen, "Germanium Glasses, Removal of OH-Absorption Bands," *Infrared Physics*. Vol. 1, 1961, pp. 175–81; *Optical Quartz Glass*, GOST, USSR, 15130–69; Nielsen, S, W. D. Lawson and A. F. Frey, "Some Infrared Transmitting Glasses Containing Germanium Dioxide," *Infrared Physics*, Vol. 1, 1961, pp. 21–26. In these formulations the researchers could not reach an effective level of optical quality infrared material due to the limited domain of glass formation between GeO2 and Fluorides. Creation of efficient optical quality transparent glasses in simple binary systems of the type GeO2—RFx where R is alkaline and earth alkaline elements is difficult. In the temperature range of 1,1000 to 1,300° C., GeO2 and Fluoride form highly volatile germanium fluoride (GeF, GeF2, GeF4) and thereby change the stoichometry of the melt. This results in formation of a highly absorbent multicrystalline melt.

In the instance of a preferred embodiment of the invention the melting method of synthesis reduces the multicrystalization by introducing the GeO2 component into the melt as a metagermanate (LGeO3), a tetragermanate (LGe4O9); or a complex compound of other elements. In this instance L, is from the group Ba, Ca, Sr, Pb, Bi, Mg. Barium is the element experimentally tested to determine the characteristics of the preferred group of glasses. This process makes it possible to create transparent pseudoternary fluoride containing glasses.

One particularly useful compound of the group LGe4O9 tetragermanates is BaGe4O9 to introduce GeO2 as the glass network former for creation of psuedoternary germanium fluorophosphate glasses. Table I illustrates the possible domain of glass formation for compositions of BaGe4O9—Ba(PO3)2—RFx where R is Ba, Ca, Mg, Pb or Bi and x is 2 or 3. As can be seen, glasses with the MgF2 component are distinct in their ability to form glasses with up to 80 to 85 mol %. The other fluoride-based components can be used to form glasses with up to 50 to 60 percent mol percent thereof.

TABLE I

Limits of Glass-Formation in BaGe4O9-Ba(PO3)2-RFX systems (mol %)

| BaGe4O9 | Ba(PO3)2 | BaF2 | CaF2 | MgF2 | PbF2 | BiF3 |
|---|---|---|---|---|---|---|
| 0–100 | | | | | | |
| | 0–100 | | | | | |
| 10–90 | 10–90 | 10–60 | | | | |
| 10–90 | 10–90 | | 10–50 | | | |
| 10–90 | 10–90 | | | 10–85 | | |
| 10–90 | 10–90 | | | | 10–50 | |
| 10–90 | 10–90 | | | | | 10–50 |

The composition of the base compounds is calculated for 100% mol or weight. The added dopants and codopants introduced into the composition create a glass formation in excess of 100% mol or weight. Generally in the formation of these glasses the concentration of BaGe4O9 varies from approximately 10 to 60 mol percent and that of Ba(PO3)2 from approximately 10 to 70 mol percent. The infrared spectra of these synthesized glasses is similar to the superimposed spectra of glasses of germanates, metaphosphates and orthophosphates or of the radicals Me(O,F)6 and MeF4.

Glasses that contain 50 to 60 mol percent of Ba(PO3)2 have fluorophosphates and germanium phosphate as structural forming components. The infrared bands of Ge—O—P are found in the regions 1,100 to 1,110 cm$^{-1}$ and 1,070 to 1,050 cm$^{-1}$. This creates the formation of germanium orthophosphate structures, Ge3(PO4)4. Glasses containing more than 60 mol percent of Ba(PO3)2 are formed by fluorophosphates and pure germanate compounds. Germanium phosphates glasses containing Fluoride are formed from structured elements of the form (GeO4)4$^-$, (PO3)n1$^-$, MeF4, Me(O,F)6 and Ge—(—O—P—)4.

Examples of effective compositions and properties of the germanium-fluorophosphate laser glasses for the composition BaGe4O9—Ba(PO3)2—BaF2—Nd2O3 are illustrated in Table II based on mass percent and identified as glass compositions 1 through 5.

TABLE II

Properties of Glass

| Composition (mass %) | 1 | 2 | 3 | 4 | 5 |
|---|---|---|---|---|---|
| Ba(PO3)2 | 75.97 | 54.25 | | 16.5 | 13.52 |
| BaGe4O9 | 18.39 | 35.02 | | 63.9 | 78.46 |
| BaF2 | 5.64 | 10.73 | | 19.60 | 8.02 |
| Nd2O3 | 3.00 | 3.00 | | 2.00 | 4.00 |
| Refractive Index | 1.6490 | 1.6380 | | 1.6480 | 1.6290 |
| Density g/cm3 | 3.46 | 3.30 | | 3.45 | 3.27 |
| Luminescence Yield | 72–75 | 70–75 | | 60–72 | 70–72 |

The Luminescence Yield is the quantum yield of luminescence for line 1064 nm (%) The Nd dopant raises the mass % of the composition above 100%.

Table III illustrates the same compositions based on mol percent compared to weight percent.

TABLE III

| | Glass Composition, in mol % | | | Composition, in wt % | | |
|---|---|---|---|---|---|---|
| No | Ba(PO3)2 | BaGe4O9 | BaF2 | Ba(PO3)2 | BaGe4O9 | BaF2 |
| 1 | 80 | 10 | 10 | 75.97 | 18.39 | 5.64 |
| 2 | 60 | 20 | 20 | 54.25 | 35.02 | 10.73 |
| 3 | 40 | 30 | 30 | 34.51 | 50.12 | 15.37 |
| 4 | 20 | 40 | 40 | 16.50 | 63.9 | 19.60 |
| 5 | 20 | 60 | 20 | 13.52 | 78.46 | 8.02 |

Table IV indicates the relative concentration of Dopants and Co-dopants over 100 percent of the laser glass compositions.

TABLE IV

Nd2O3-1; Nd2O3-5; Nd2O3: Yb2O3-0.5:5
Er2O3-1; Er2O3-5; Er2O3: Yb2O3-0.5:5
Tm2O3: Tb2O3-1:3; Tm2O3: Yb2O3-1:5
Ho2O3-1; Ho2O3-5; Ho2O3: Yb2O3-1:5
Pr2O3-1; Pr2O3-5; Pr2O3: Yb2O3-1:5

In this table the dash (−) numbers indicate the weight percent. Also, Mn(II) may be substituted for Yb(III) in these formulations.

The resultant synthetic composition of the BaF2 example glasses is illustrated in Table V based on weight percent.

TABLE V

| Glass No. | P2O5 | GeO2 | BaO | BaF2 |
|---|---|---|---|---|
| 1 | 35.56 | 13.46 | 44.27 | 5.64 |
| 2 | 26.10 | 25.63 | 37.51 | 10.73 |
| 3 | 16.62 | 36.69 | 31.22 | 15.37 |
| 4 | 7.94 | 46.77 | 25.67 | 19.60 |
| 5 | 6.51 | 57.43 | 28.02 | 8.02 |

For comparison purposes the mol percent of the chemical substances of glass formation and resultant synthetic composition in mol percent are presented in Table VI.

TABLE VI

Glass containing the following components (in mol %)

| | |
|---|---|
| BaF2(CaF2, MgF2, BiF3, PbF2) | 10–70 |
| GeO2 | 7.31–58.48 |
| P2O5 | 4.81–38.50 |
| BaO | 7.86–62.94 |

Composition of glasses in the form of chemical substances (in mol %)

| | |
|---|---|
| BaF2(CaF2, MgF2, BiF3, PbF2) | 10–70 |
| BaGe4O9 | 10–80 |
| Ba(PO3)2 | 10–80 |

The percentage range of compounds presented in this table reflect the glass composition most practical in mol percent.

The dopant and co-dopant ranges that are contained in the glass compositions in weight percent amounts that create a total composition over 100 percent are illustrated in Table VII.

TABLE VII

| | |
|---|---|
| Nd2O3(NdF3) | 0.5–15 |
| Er2O3(ErF3) | 0.2–12 |
| Yb2O3(YbF3) | 1.0–15 |
| Ho2O3(HoF3) | 1.0–10 |

TABLE VII-continued

| | |
|---|---|
| Pr2O3(PrF3) | 0.5–12 |
| Tm2O3(TmF3) | 0.2–10 |
| Tb2O3(TbF3) | 0.1–10 |
| MnO(MnF2) | 0.5–20 |

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A germanium fluorophosphate glass formed from a composition comprising on a mol basis:
    a tetragermanate, LGe4O9, from 10 to 90 percent wherein L is selected from the group consisting of Ba, Ca, Sr, Pb, Bi, and Mg;
    a metaphosphate barium, Ba(PO3)2, from 10 to 90 percent;
    a fluoride, RFx from 10 to 85 percent wherein R is selected from the group consisting of Ba, Ca, Mg, Pb, and Bi, and x is the valence of R; and a rare earth dopant.

2. A germanium fluorophosphate glass formed from a composition comprising on a mol basis:
    a tetragermanate barium, BaGe4O9, from 10 to 90 percent;
    a metaphosphate barium, Ba(PO3)2, from 10 to 90 percent;
    a fluoride, RFx from 10 to 85 percent wherein R is selected from the group consisting of Ba, Ca, Mg, Pb, and Bi, and x is the valence of R; and a dopant.

3. The glass as in claim 2 wherein the composition in mol percent is in excess of 100 percent when doped.

4. The glass as in claim 2, wherein the fluoride on a mol basis is BaF2 from 10 to 60 percent.

5. The glass as in claim 2 wherein the fluoride on a mol basis is CaF2 from 10 to 50 percent.

6. The glass as in claim 2 wherein the fluoride on a mol basis is MgF2 from 10 to 85 percent.

7. The glass as in claim 2 wherein the fluoride on a mol basis is PbF2 from 10 to 50 percent.

8. The glass as in claim 2 wherein the fluoride on a mol basis is BiF3 from 10 to 50 percent.

9. The glass as in claim 2 wherein the dopant is selected from: the group of oxides of the rare earth elements neodymium (Nd), erbium (Er), ytterbium (Yb), thulium (Tm), terbium (Tb), holmium (Ho), praseodymium (Pr);
    an oxide of manganese (Mn); and
    mixtures thereof.

10. The glass as in claim 9 wherein the dopant is selected from the fluoride form of the oxide dopant.

11. The glass as in claim 9 wherein the dopant on a weight percent basis is Nd2O3 from 0.5 to 15 percent.

12. The glass as in claim 9 wherein the dopant on a weight percent basis is Er2O3 from 0.2 to 12 percent.

13. The glass as in claim 9 wherein the dopant and co-dopant on a weight percent basis is Yb2O3 from 1.0 to 15 percent.

14. The glass as in claim 9 wherein the dopant on a weight percent basis is Tm2O3 from 0.2 to 10 percent.

15. The glass as in claim 9 wherein the dopant on a weight percent basis is Tb2O3 from 0.1 to 10 percent.

16. The glass as in claim 9 wherein the dopant on a weight percent basis is Ho2O3 from 1.0 to 10 percent.

17. The glass as in claim 9 wherein the dopant on a weight percent basis is Pr2O3 from 0.5 to 12 percent.

18. The glass as in claim 9 wherein the dopant and co-dopant on a weight percent basis is MnO from 0.5 to 20 percent.

19. A germanium fluorophosphates glass comprising in mol percent:
    an oxide of phosphate, P2O5, from 4.81 to 38.50 percent;
    an oxide of germanium, GeO2, from 7.31 to 58.48 percent;
    an oxide of barium (BaO) from 7.86 to 62.94 percent; and
    a fluoride selected from the group barium fluoride (BaF2), calcium fluoride (CaF2), magnesium fluoride (MgF2), bismuth fluoride (BiF3) and lead fluoride (PbF2) from 10 to 70 percent.

20. A method for making germanium fluorophosphates glass comprising the steps of:
    batching the glass components;
    melting the glass components to form a molten mixture;
    cooling the molten glass mixture to a solid state;
    annealing the glass in the solid state;
    cooling the annealed glass to approximately ambient temperature;
    the glass components comprised on a mol percent basis of BaGe4O9 from 10 to 90 percent; Ba(PO3)2 from 10 to 90 percent; a fluoride selected from the group of BaF2, CaF2, MgF2, PbF2 and BiF3 from 10 to 85 percent; and a dopant on a weight percent basis selected from the group of Nd2O3 from 0.5 to 15 percent, Er2O3 from 0.2 to 12 percent, Yb2O3 from 1.0 to 15 percent, Tm2O3 from 0.2 to 10 percent, Tb2O3 from 0.1 to 10 percent, Ho2O3 from 1.0 to 10 percent, Pr2O3 from 0.5 to 12 percent, and MnO from 0.5 to 20 percent and mixtures thereof.

21. The method as in claim 20 wherein the melting of the glass is performed in the temperature range of 1,230° C. to 1,310° C. in platinum crucibles in a dry argon atmosphere for from 4 to 5 hours.

22. The method as in claim 20 wherein the annealing of the glass is performed in the temperature range of 350° C. to 360° C. for from 5 to 6 hours.

* * * * *